(«12») United States Patent
Bayer

(10) Patent No.: US 10,471,636 B2
(45) Date of Patent: Nov. 12, 2019

(54) CARRIER FOR SEALING A MOLD CAVITY, MULTICOMPONENT PLASTIC PART CONTAINING SAID CARRIER, AND DEVICE AND METHOD FOR PRODUCING THE MULTICOMPONENT PLASTIC PART

(71) Applicant: KraussMaffei Technologies GmbH, München (DE)

(72) Inventor: Stefan Bayer, Aying (DE)

(73) Assignee: Kraus Maffei Technologies GmbH, München (DE)

( * ) Notice: Subject to any disclaimer, the term of this patent is extended or adjusted under 35 U.S.C. 154(b) by 725 days.

(21) Appl. No.: 14/439,575

(22) PCT Filed: Oct. 23, 2013

(86) PCT No.: PCT/EP2013/072193
§ 371 (c)(1),
(2) Date: Apr. 29, 2015

(87) PCT Pub. No.: WO2014/072178
PCT Pub. Date: May 15, 2014

(65) Prior Publication Data
US 2015/0258719 A1 Sep. 17, 2015

(30) Foreign Application Priority Data

Nov. 6, 2012 (DE) .................. 10 2012 110 602

(51) Int. Cl.
*B29C 45/14* (2006.01)
*B29C 45/16* (2006.01)
(Continued)

(52) U.S. Cl.
CPC .... *B29C 45/14008* (2013.01); *B29C 45/0081* (2013.01); *B29C 45/16* (2013.01);
(Continued)

(58) Field of Classification Search
CPC . B60N 2/80; B60N 2/879; B60N 2/90; B60N 2/803; B60N 2/806; B60N 2/809;
(Continued)

(56) References Cited

U.S. PATENT DOCUMENTS 4,065,539 A * 12/1977 Nadel .................. A45D 33/006
264/251
2007/0284902 A1 12/2007 Reed et al.
(Continued)

FOREIGN PATENT DOCUMENTS

DE 102011000494 8/2012
DE 102011017408 10/2012
FR 2850898 A1 * 8/2004 ......... B29C 45/0081

OTHER PUBLICATIONS

Machine translation of FR-2850898, Aug. 2004.*
(Continued)

*Primary Examiner* — Philip C Tucker
*Assistant Examiner* — Jimmy R Smith, Jr.
(74) *Attorney, Agent, or Firm* — Henry M. Feiereisen LLC

(57) ABSTRACT

A plastic carrier for sealing a mold cavity during the production of a multicomponent plastic part, wherein at least one component flows over a plastic element and the carrier, with the carrier becoming an integral part of the multicomponent plastic part. The carrier has a central region sealing the mold cavity when the plastic element is inserted into the mold cavity, a first main face facing the mold cavity and a second main face facing away from the first main face. The carrier has a peripheral edge extending beyond the central region and the outer circumference of the mold cavity, allowing the at least one component to flow over the first main face of the peripheral edge. The carrier also has a first edge region forming a fold-over projection and a second (Continued)

edge region arranged between the central region and the first edge region for forming a film hinge.

8 Claims, 2 Drawing Sheets

(51) Int. Cl.
  *B29C 67/24* (2006.01)
  *B29C 45/00* (2006.01)
  *B29K 75/00* (2006.01)
  *B29L 9/00* (2006.01)
(52) U.S. Cl.
  CPC ........ *B29C 67/246* (2013.01); *B29C 45/0055* (2013.01); *B29C 45/1671* (2013.01); *B29K 2075/02* (2013.01); *B29L 2009/00* (2013.01); *Y10T 428/24008* (2015.01); *Y10T 428/24488* (2015.01)
(58) Field of Classification Search
  CPC ..... B29C 45/16; B29C 45/14; B29C 45/0081; B29C 45/14008; B29C 45/14336; B29C 45/14778; B29C 45/1671; B29L 2009/00
  USPC ........ 297/391, 394, 399, 220; 264/279, 255, 264/275
  See application file for complete search history.

(56) References Cited

U.S. PATENT DOCUMENTS

2008/0073807 A1   3/2008  Cowelchuk et al.
2011/0102922 A1*  5/2011  Nottage ................ A45D 42/18
                                        359/851

OTHER PUBLICATIONS

International Search Report issued by the European Patent Office in International Application PCT/EP2013/072193 dated Feb. 14, 2014.
"Hochwertige Premium-Oberfläche aus Spritzgless—und Reaktionstechnik", in: Kunststoffe, Carl Hanser Verlag, München, Germany, Jan. 1, 2004.

* cited by examiner

CARRIER FOR SEALING A MOLD CAVITY, MULTICOMPONENT PLASTIC PART CONTAINING SAID CARRIER, AND DEVICE AND METHOD FOR PRODUCING THE MULTICOMPONENT PLASTIC PART

CROSS-REFERENCES TO RELATED APPLICATIONS

This application is the U.S. National Stage of International Application No. PCT/EP2013/072193, filed Oct. 23, 2013, which designated the United States and has been published as International Publication No. WO 2014/072178 A1 and which claims the priority of German Patent Application, Serial No. 10 2012 110 602.9, filed Nov. 6, 2012, pursuant to 35 U.S.C. 119(a)-(d).

BACKGROUND OF THE INVENTION

The present invention relates to a carrier made of plastic for sealing a mold cavity in the manufacture of multi-component plastic part, a multi-component plastic part, and an apparatus and a method for producing a multi-component plastic part.

With the improvement of the external appearance of plastic parts, various methods have been developed to make the respective surfaces as visually appealing as possible. In particular, the SkinForm and ColorForm methods should be mentioned here, wherein plastic parts can be flooded with one or more components in a closed mold. In this way, multi-component plastic parts can be produced. Flooding is performed with a very low-viscosity material such as polyurethane or polyurea. Since these are one or more components of a low viscosity material, but are very fluid, the mold cavity in the mold, which is made of steel, cannot be sealed by using a steel carrier. The mold cavity must therefore always be sealed by a carrier made of plastic to ensure sufficient tightness. In addition, a sprue cavity and an overflow cavity must be provided when flooding of the plastic carrier, since air is unable to escape due to the good sealing properties of steel on plastic which normally occurs in conventional injection molding molds by way of the parting line. The air in the cavity—and possibly also flooding material—is thus forced into the so-called overflow cavity.

Due to the initially described procedure for the production of multi-component plastic parts, a border formed by the carrier material is thus always visible at the outer edge of the coated plastic parts. However, this is undesirable for many components. For these reasons, a pleat is often required, which cannot be implemented with conventional devices, since otherwise the parting line through the mold would be visible, which usually does not meet the quality requirements of the manufacturer and/or of the customers. As another disadvantage, the overflow cavity and the sprue cavity must usually be removed in a separate operation. In addition, areas separated by punching or laser ablation are always noticeable from the side and thus diminish the attainable quality of the finished multi-component plastic part.

SUMMARY OF THE INVENTION

It is therefore the object of the present invention to propose a carrier for sealing a mold cavity in the manufacture of a multi-component plastic part, a multi-component plastic part, an apparatus and a method for producing a multi-component plastic part, with which the aforementioned disadvantages can be overcome, while making it possible to supply and/or produce high-quality multi-component plastic parts with aesthetically appealing and very smooth surfaces, but without visible borders, especially borders to the plastic carrier. The preparation of these multi-component plastic parts should be cost-effective and efficient.

According to the invention, a carrier made of plastic for sealing a mold cavity in the manufacture of multi-component plastic part is provided, wherein in production a plastic element and the carrier are flooded with at least one component, with the carrier thereby becoming an integral part of multi-component plastic part. Such contemplated flooding techniques are in particular the SkinForm process and the ColorForm process, which are used for example by the KrausMaffei Group.

The carrier according to the invention has a central region which can be used to seal the mold cavity when a plastic element to be flooded is inserted into the mold cavity. The carrier is formed more or less two-dimensional and has a first main face and a second main face facing away from the first main face and hence from the mold cavity. The carrier according to the invention is characterized in that it further includes a peripheral edge that projects beyond the central region and thus also beyond the outer periphery of the mold cavity, i.e. away from the plastic element in the direction of the separating plane. The peripheral edge is designed—which also means that it can be located inside the mold—such that it is flooded on its first main face with the at least one component (or several components, if necessary or desired). In other words, the arrangement and the design of the carrier are selected so as to produce a seamless and therefore invisible transition of the liquid component from the plastic element inserted in the mold on the first main face. Moreover, it is important for the invention that the peripheral edge has a first outer edge region provided for forming a foldable protrusion, as well as a second edge region disposed between the central region and the first edge region, which is suitable for forming a so-called film hinge. This film hinge can be bent or folded or folded over after the at least one component has been flooded, without causing the component with which the film hinge is covered to chip or flake. It is clear that the first edge region is also bent or folded when the film hinge and the second edge region are folded or bent. This first edge region can be folded or folded over by about 180°, with the component located on the hinge ensuring that when plastic element is attached thereto, no visible border exists between the plastic element and carrier.

According to a preferred embodiment of the carrier according to the invention, first connecting elements are provided on or at the second main face of the first edge region, and second connecting elements are provided at or on the second main face of the central region. The first connecting elements and the second connecting elements are constructed and arranged such that a first connecting element is always connected with a second connecting element after the first edge region has been folded over in such a way that the second main face of the first edge region is in each case located at least substantially opposite of the second main face of the central region. In other words, the folded-over edge region is in this position fixed in the folded position. The first connecting elements and the second connecting elements are formed in a particularly simple and expedient manner as matching interlocking elements, which can each be brought into interlocking engagement with other locking elements. Such interlocking elements may possibly be combined to form, for example, a closed, circumferential locking groove and a circumferential locking lug. In an advantageous embodiment of the invention, however, a first connecting element and a second connecting element associated therewith may form a pair, which is designed, on the one hand, as a latching projection and, on the other hand, as an associated latching recess. The exact nature and design of these locking projections and recesses can be conveniently adapted to specific requirements. For example, each pair may be formed as a type of push button with a corresponding recess. However, the pairs may be constructed as respective locking lugs which engage behind each other.

Advantageously, a plurality of retaining projections may extend from the first main face of the first edge region away from the first main face. Preferably, the retaining projections may project approximately perpendicular with respect to the first main face and hence also perpendicular with respect to the parting plane in the mold, and in particular project farther from the first edge region than corresponding to the thickness of the layer that has the component with which the carrier is coated or is to be coated. In other words, when the retaining projections extend farther from the first major surface than the layer thickness of the component, the retaining projections form quasi pins or domes that are "hooked" in the two-dimensional component covering the carrier and hence the first edge region of the carrier. A certain retaining effect is also achieved when the retaining projections are formed so as to be covered by the component. However, this retaining effect can be increased when the retaining projections project beyond the component. A mechanical connection between the carrier and the material of the component applied by flooding is produced between the pins or domes. This prevents detachment of the two materials due to the forces occurring during folding or folding-over.

The object forming the basis of the invention is also attained with a multi-component plastic part which includes a carrier as described above, whose first edge region is bent so that its second main face comes to rest against the second main face of the central region. The multi-component plastic part according to the invention further includes a plastic element placed against or located on the first main face of the central region of the carrier and at least one component applied by flooding which covers, on the one hand, the plastic element and, on the other hand, at least the first main face of the second edge region or film hinge. This ensures that not only the plastic element itself, but also the film hinge or the second edge region is covered by the component that is intended to communicate a particular external appearance. This ensures that no edge is visible between the plastic element and plastic carrier. It is clear that it can be advantageous when the component also covers the first (outer) edge region that is folded or folded over. In this way, the side of the multi-component plastic part facing away from the plastic element and forming, for example, a bottom side can be provided with the same surface without producing any edge perceived as disturbing or as a deviation in color or shading. The advantages and features described in conjunction with preferred or advantageous embodiments of the invention apply, of course, in the same way to the multi-component plastic part according to the invention. These advantages and features will not be described again for the sake of clarity.

The object of the invention is also attained with an apparatus for producing a multi-component plastic part, wherein a plastic element and a carrier is flooded with at least one component and the carrier thereby becomes an integral part of the multi-component plastic part. The apparatus according to the invention includes an injection molding unit for injection molding of a plastic element and for flooding the plastic element with at least one component, wherein the injection unit includes a corresponding mold cavity. The apparatus of the invention is characterized in that the injection unit is designed so that an above-described carrier for sealing the mold cavity of the injection unit is placed with its first major side in the course of production of multi-component plastic part against the plastic element and that thereafter at least the first major side can be flooded from its second edge region by the at least one component. In other words, the arrangement must be constructed such that the carrier can be placed or inserted into the mold in such a way that the carrier readily abuts the plastic element with which it is to be connected, without impeding in the further course. Thus, the apparatus must be configured accordingly or modified from the known apparatuses such that carrier with a suitably shaped peripheral edge can also be used. In addition, the apparatus according to the invention must include an associated bending device that is suitable to bend the first edge region of the carrier in a way that the second main face of the first edge region comes to lie approximately opposite the second main face of the central region. In other words, the first edge region of the carrier must be able to be bent or folded over by the bending device by about 180°, with the second edge region serving as a film hinge. It may be advantageous for a faster workflow or higher throughput in the production of multi-component plastic parts when the bending device integrated into the apparatus according to the invention and is not provided as a separate, subsequent station. This can ensure, for example, a more efficient production of multi-component plastic parts.

The object of the invention is also attained with a method for producing a multi-component plastics part, wherein a plastic element and a carrier made of plastic are flooded with at least one component and the carrier becomes an integral part of multi-component plastic part. The method includes the following steps: a plastic element is provided, which can be accomplished, for example, by molding the plastic element in the same injection molding apparatus, in which also the flooding takes place. In addition, a carrier as described above is provided, which may also be accomplished by molding the carrier in the same apparatus. In addition, the carrier is placed or left in place against the plastic element, provided that the carrier is already located on the plastic element after molding. Finally, the plastic element is flooded with the at least one component, wherein in addition at least the second edge region of the carrier (i.e., the film hinge) is also flooded at the same time. Lastly, the first edge region is folded over or bent by bending or folding the carrier at the second edge region, so that the second main face of the edge region comes to rest opposite the second main face of the central region. This corresponds to folding over the first edge region by about 180°, i.e. toward the inner side of the component.

After the first edge region is folded over or bent, the folded first edge region is preferably connected to the central region, as already described in connection with the carrier according to the invention, which preferably takes place by corresponding locking devices or snap hooks.

As stated previously, the carrier according to the invention is designed so that a very thin peripheral edge constituting a so-called film hinge is provided in the outer region. This region is flooded with one or more components and then mechanically bent or folded toward the inner side of the component, and optionally locked. Thus, an edge with the carrier material is no longer visible from the outside, and the entire multi-component plastic part presents itself instead with a uniform and aesthetically pleasing surface.

According to another advantage of the present invention, the sprue cavity and the overflow cavity need no longer be removed in a separate processing step, because these cavities are hidden underneath the component due to the folded-over and bent first edge region.

Since the edge extends completely around the component, improved venting of the mold cavity can also be expected, which may reduce the amount of waste in the production of multi-component plastic parts, which would otherwise be caused by air bubbles.

With the present invention, the design requested by the customer may be achieved by folding over the first edge region, which may also be referred to as a flip-pleat. The present invention also simplifies the assembly with respect to the components and molds.

The present invention also enables for a more efficient production of the multi-component plastic parts by eliminating an additional process step of removal of material by punching or with a laser.

BRIEF DESCRIPTION OF THE DRAWING

Further advantages, features and characteristics of the present invention will become apparent from the following description of advantageous embodiments of the invention with reference to the accompanying drawings, which show in.

DETAILED DESCRIPTION OF PREFERRED EMBODIMENTS

For the following description of a preferred embodiment of a multi-component plastic part 20 according to the invention and of a carrier 10 contained therein, it will be assumed by way of example that this is a headrest for a motor vehicle. It will be understood, however, the present invention is not limited to this particular example, but that the invention is applicable to a wide variety of plastic parts. The same applies to the description of an inventive apparatus 50 for manufacturing the multi-component plastic part 20 as well as for the corresponding manufacturing process.

Figure 1:
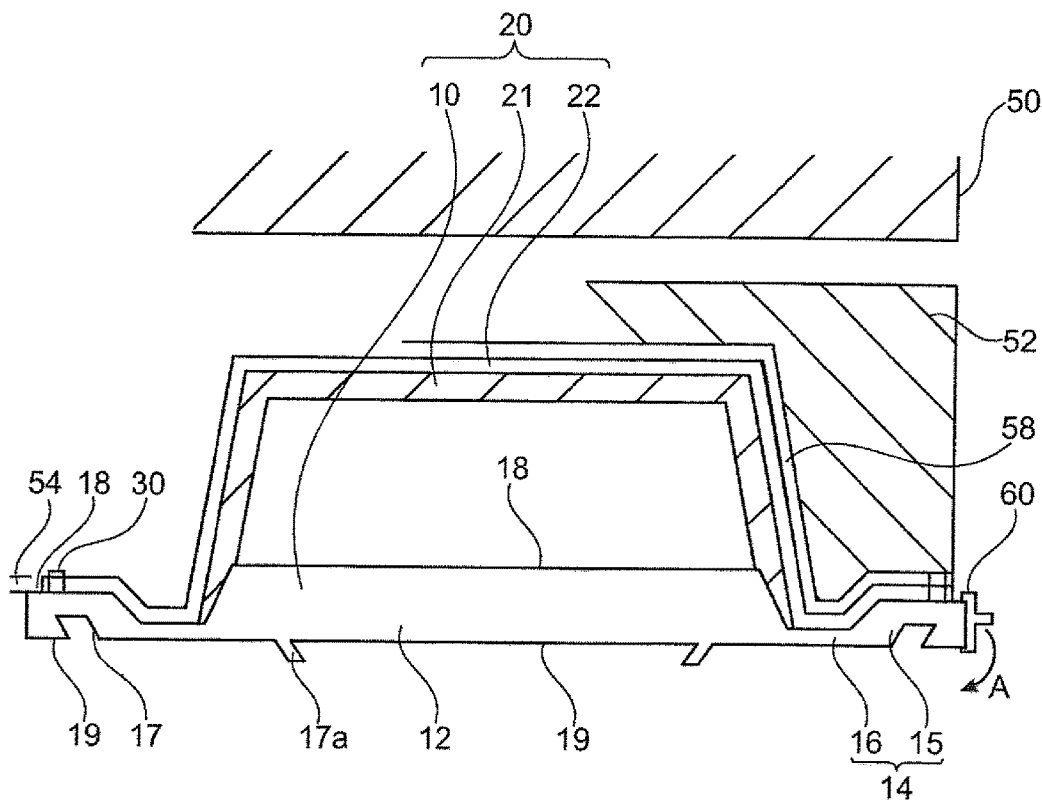
FIG. 1 a cross-section through an advantageous embodiment of a carrier according to the invention with a fitted plastic element, wherein the first edge region of the carrier is not bent, and wherein both the carrier and the plastic element are flooded by a component.

In FIG. 1 shows in a schematic diagram an apparatus denoted by 50 for producing a multi-component plastic part 20 with a corresponding mold 52. This mold 52 is part of a corresponding mold of an injection molding unit in which a mold cavity 58 for casting or molding the headrest (or the multi-component plastic part) 20 is provided. As shown in FIG. 1, a plastic element 21 representing the unfinished headrest has already been molded in the mold cavity 58. A likewise a cast carrier 10 made of plastic is inserted at the bottom of the plastic element 21 which is open at the bottom. The carrier 10 has a central region 12 which is inserted into the plastic element 21 from below.

The carrier 10 is—apart from a certain pattern, which will be discussed later—designed as a flat component and has a first main face 18 located at the top and a second main face 19 located at the bottom. The outer side of the carrier 10 is formed by a first edge region 15. A second edge region 16 with a thickness smaller than the first edge region 15 is formed between the first edge region 15 and the central region 12. Due to the smaller thickness of the second edge region 16, the carrier 10 can be easily bent, folded or pleated over the second edge region 16, so that the first edge region 15 and also part of the second edge region 16 can be bent by approximately 180° toward the bottom side or the second main face 19 of the central region 12.

A low-viscosity component 22 (or several of these components) can be injected into the mold cavity 58 through a schematically illustrated injection channel or sprue 54 in the injection molding apparatus 50 and the injection molding unit 52, whereafter the component 22 flows around the plastic element 21 in the mold cavity 58 and finally forms a film in or on the second edge region 16 and on the first edge region 15. The second edge region 16 thus serves as a so-called film hinge for the above-described folding-over and bending of the carrier 10 on the second edge region 16. The carrier 10 together with the attached plastic element 21 forms a headrest 20 (multi-component plastic part), which does not have a visible border with the carrier 10 at the side edge, but rather has a uniform and aesthetically pleasing surface.

Several pins or domes 30 protrude from the surface on the first main face 18 of the first edge region 15; these protrude from the first main face 18 far enough so that the component 22 flows around them, without being submerged or covered. After the component 22 has solidified, a mechanical connection between the component 22 and the carrier 10 is produced, thereby even more effectively preventing the component 22 to chip or flake off from the carrier 10.

Figure 2:
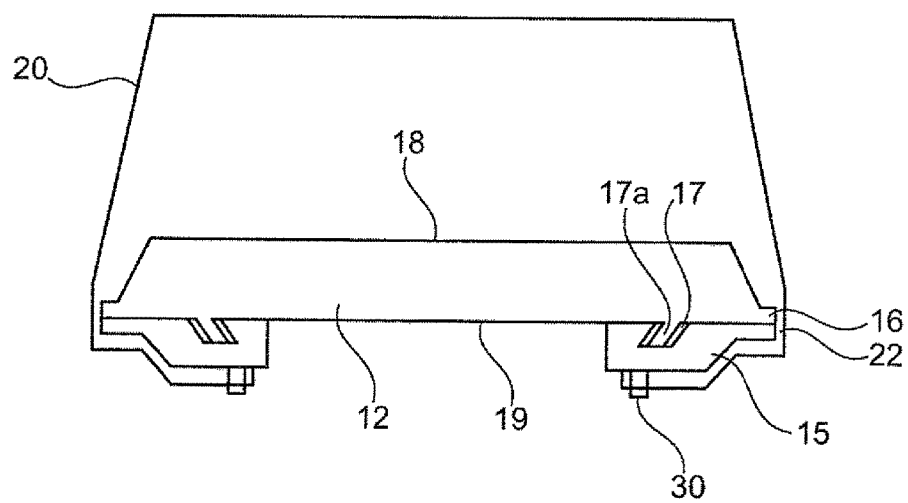
FIG. 2 a cross-sectional view of a multi-component plastic part according to the invention with an already folded-over first side edge of the carrier.

Recesses 17 shaped as blind holes and having an axis forming an angle of approximately 30° with respect to the surface normal to the second major surface 19 are provided on the second major surface 19 of the first edge region 15. Projections 17a extending approximately parallel to the recesses 17 and hence also forming an angle of approximately 30° with respect to the surface normal to the second major surface 19 are located on the second major surface 19 of the central region 12. It will be understood that this angle of 30° is not essential to the operability of the present invention and that other angles may be provided. As is apparent from the illustration of FIG. 1 (and in addition from FIG. 2), the recesses 17 together with the pins 17a form respective interlocking connecting elements which each interlock as soon as the first edge region 15 at the second edge region 16 is folded inwardly or downwardly by approximately 1800 onto the inner side of the component, wherein in this example a respective pin 17a engages in a corresponding recess 17. This interlocked state is clearly visible in FIG. 2. Of course, the connecting elements 17 and 17a can also be configured in some other way in order to ensure an interlocking connection or even more generally, a mutual interlock of the first edge region 15 with the central region 12.

Figure 3:
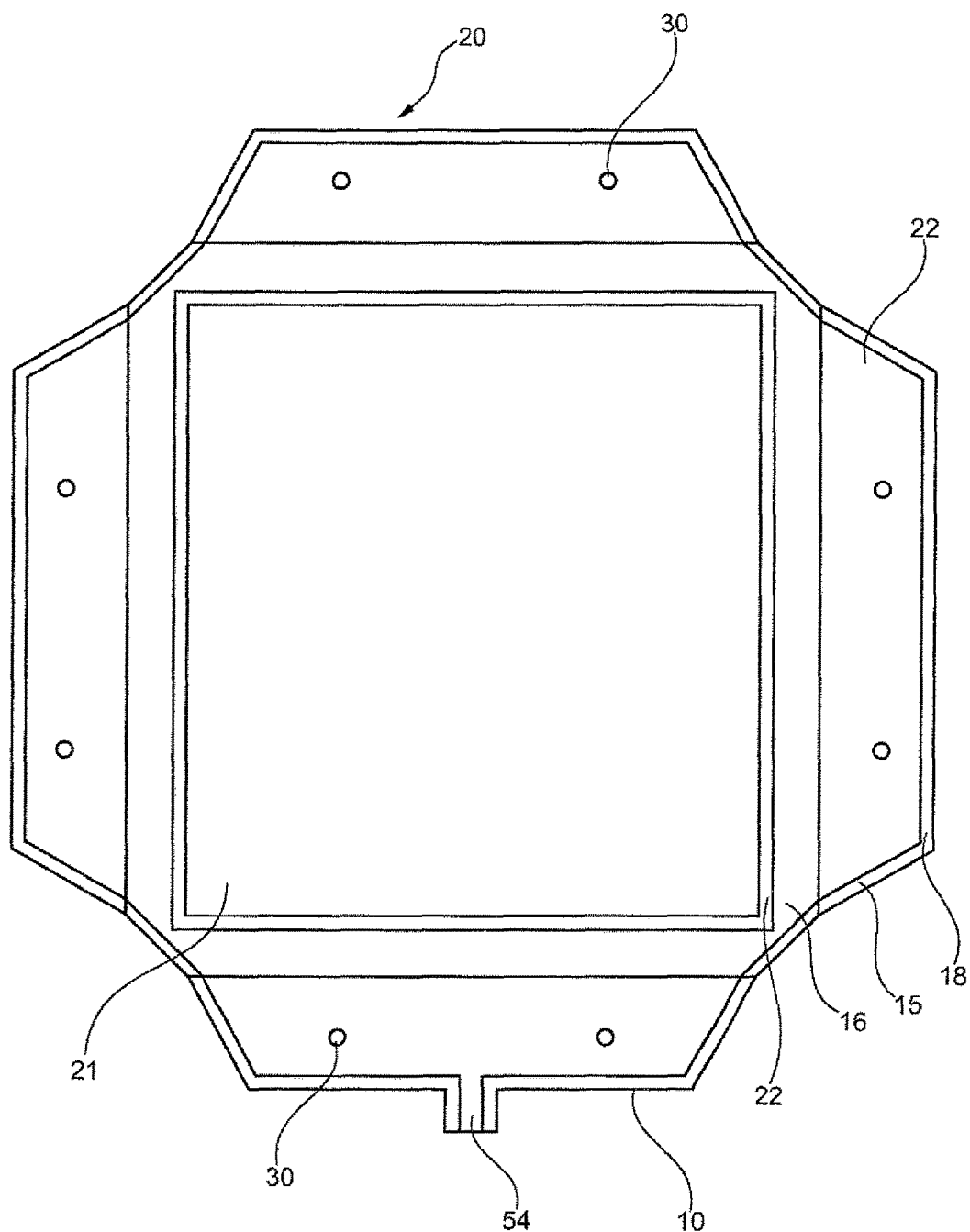
FIG. 3 a plan view of a carrier according to the invention with a fitted plastic element after flooding, but prior to folding over the first edge regions of the carrier.

As shown in FIG. 3, the respective first edge region 15 of a plastic element 21 illustrated here as having an exemplary square "cross-section" is tapered at the respective corners of the square such that the first edge regions 15 can be folded completely by folding or refolding the respective second edge regions 16 completely onto the side of the plastic element 21 that is not visible in the drawing. The schematically illustrated sprue 54 is also folded over together with the invisible side of the plastic part, so that the sprue, like the unillustrated overflow, does not need to be specifically removed. A multi-component plastic part 20 according to the invention can thus be readily prepared in a few steps, since the steps of punching or laser ablation of sprue or overflow can be omitted. Furthermore, no visible edge is produced at the respective side edges of the multi-component plastic part 20, so that the multi-component plastic part 20 presents itself with an aesthetically very appealing uniform surface without disturbing edge effects. Bending the first edge regions 15 by means of the so-called flip-pleating thus produces an excellent surface of the multi-component plastic part 20. This also simplifies the construction of the mold. Since the overflow can also prevent air bubbles, the waste in the production of multi-component plastic parts of the invention is also reduced.

As already mentioned above, an apparatus 50 according to the invention for the production of the multi-component plastic part 20 must be modified with respect to the prior art apparatuses by designing or modifying the injection unit 52 so that the carrier 10 intended for sealing the mold cavity during flooding can be placed in contact with the mold cavity 58 such that the latter is, on the one hand, well enough sealed and, on the other hand, allows the at least one component 22 to flow onto the second edge region 16 and the first edge region 15. In addition, a bending device 60 illustrated here only schematically as a gripper, which bends the first edge region in the direction indicated by the arrow A, must be associated with the apparatus 50. The bending device 60 must of course be configured to be movable so that the first edge region 15 can be folded by approximately 180° so that the second main face 19 of the first edge region comes to rest opposite the second main face 19 of the central region 12, and if necessary, the connecting devices 17 and 17a can be snapped together. It may be advantageous if the bending device 60 is received as an integral part and is not arranged in its own bending station which bends the first edge region 15 only after the flooded plastic element 21 has been un molded.

In the method according to the present invention for producing the multi-component plastic part 20, a plastic part and a carrier to be connected thereto are first provided pursuant to the above description. "Providing" in this context means that these parts are either cast or supplied and then inserted into the respective mold cavity. Thereafter, the plastic element 21 is flooded so that at least the second edge region 16 on the first main face 18 of the carrier 10 is also flooded, wherein preferably a part of the first edge region 15 is also flooded, so that the component 22 adheres as closely as possible to the carrier 10 as a whole and in particular to the peripheral edge 14. Thereafter, the first edge region 15 is folded by bending of the carrier 10 onto the second edge region 16, so that the second main face 19 of the edge region 15 comes to rest opposite or on the second main face 19 of the central region 12, wherein preferably connecting elements 17 and 17a according to the above description are brought into mutual interlocking engagement, so that the first edge region 15 is fixedly connected to the central region 12.

A very simple and quick process control is attained by performing the steps of providing and placing the carrier 10 by injection molding of the carrier 10 in situ, i.e. at the location of the intended further use—, as well as by providing the plastic element by injection molding of this plastic element 21 in the mold cavity 58.

It should be noted that the features of the invention described with reference to the aforedescribed embodiment, such as the type and configuration of the first and the second edge region as well as the connecting elements and of the retaining projections, may also be present in other embodiments or examples, except when otherwise indicated or prohibited for actual technical reasons.

What is claimed is:

1. A multi-component plastic part, comprising:
   a carrier including a central region which has opposite main faces, and a peripheral region which extends the central region outwards and is defined by a first edge region and a second edge region which is arranged between the central region and the first edge region, said first edge region being folded over so that a main face of the first edge region in prolongation of one of the main faces of the central region faces and directly contacts the one of the main faces of the central region,
   a plastic element placed directly on the other one of the main faces of the central region, and
   at least one component applied by flooding and covering the plastic element and at least a main face of the second edge region in prolongation of the other one of the main faces of the central region.

2. The multi-component plastic part of claim 1, wherein the carrier includes:
   first connecting elements disposed on the main face of the first edge region, and
   second connecting elements disposed on the one of the main faces of the central region, wherein one of the first connecting elements is connected with a respective one of the second connecting elements by constructing the first connecting elements and the second connecting elements so that the main face of the first edge region faces the one of the main faces of the central region after the first edge region has been folded over.

3. The multi-component plastic part of claim 2, wherein the first connecting elements and the second connecting elements are each constructed as latching elements.

4. The multi-component plastic part of claim 2, wherein each first connecting element is arranged with a second connecting element in a pair, with each pair comprising a locking projection and an associated locking recess.

5. The multi-component plastic part of claim 1, further comprising retaining projections extending out from another main face of the first edge region in prolongation of the other one of the main faces of the central region.

6. The multi-component plastic part of claim 5, wherein the retaining projections extend approximately perpendicular to the other main face of the first edge region and are sized to protrude from the first edge region beyond a layer thickness of the at least one component.

7. A multi-component plastic part, comprising:
   a carrier including a central region which has opposite main faces, and a peripheral region which extends the central region outwards and is defined by a first edge region and a second edge region which is arranged between the central region and the first edge region, said first edge region being folded over so that a main face of the first edge region in prolongation of one of the main faces of the central region faces and directly contacts the one of the main faces of the central region,
   a plastic element placed on the other one of the main faces of the central region,
   at least one component applied by flooding and covering the plastic element and at least a main face of the second edge region in prolongation of the other one of the main faces of the central region, and retaining projections extending out from another main face of the first edge region in prolongation of the other one of the main faces of the central region.

8. The multi-component plastic part of claim 7, wherein the retaining projections extend approximately perpendicular to the other main face of the first edge region and are sized to protrude from the first edge region beyond a layer thickness of the at least one component.

* * * * *